Patented Dec. 25, 1951

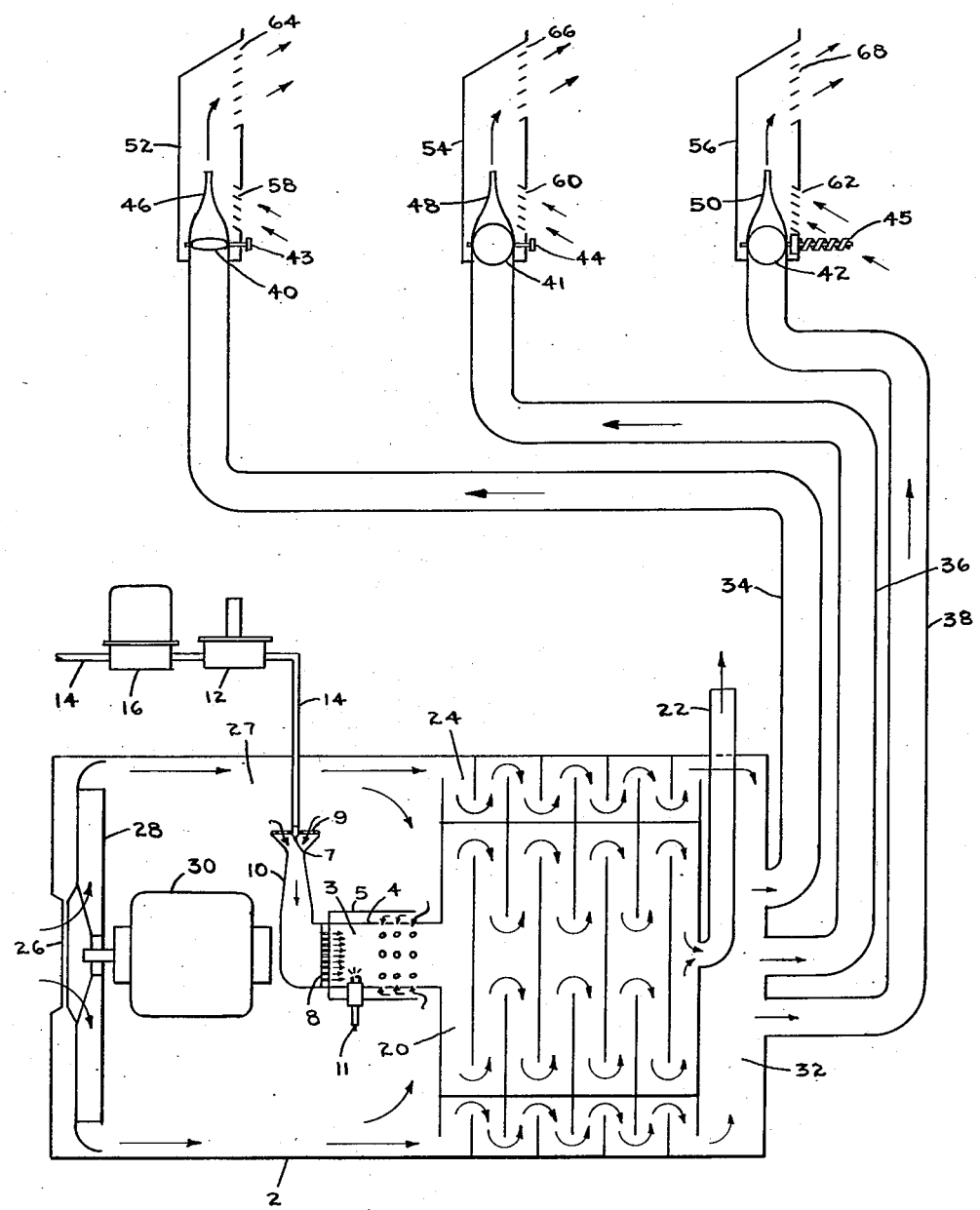

2,579,507

UNITED STATES PATENT OFFICE 2,579,507

WARM-AIR HEATING SYSTEM UTILIZING AS THE FUEL A COMBUSTIBLE GAS

Calvin D. MacCracken, Tenafly, N. J., assignor to Jet-Heet, Inc., Englewood, N. J., a corporation of New York Application September 13, 1949, Serial No. 115,406

3 Claims. (Cl. 237—2)

This invention relates to warm-air heating systems utilizing as the fuel a combustible gas.

The general object of the invention is to provide a warm-air heating system, utilizing as the fuel a combustible gas, which to a considerable extent is self-regulating and modulating so far as the consumption of the combustible gas is concerned. It is well known in heating systems that low, steady, well-modulated flow of heat is preferable to intermittent operation, particularly in a warm-air heating system. However, the cost of the required controls has been prohibitive heretofore. An object of the invention is to provide such a system at low cost without the use of any valve for varying the fuel gas flow in accordance with the demand for heat.

For its successful functioning, the heating system embodying the invention includes a pressure-regulator which maintains substantially constant and at a standard pressure the supply of combustible gas which passes through a nozzle and a primary air-mixing tube or chamber and then is burned in a suitable combustion-chamber to which both primary and secondary air is supplied by a fan at varying pressures which are always somewhat lower than the pressure at which the gas is supplied. As will be understood from the explanation of the operation of the system hereinafter set forth, the varying pressures of the air supplied by the fan result solely from variations in the impedance to the flow of air through the system, the fan, of course, being driven by the electric motor at a constant rate of speed. This same fan supplies air to a heat-exchanger having a chamber connected to said combustion-chamber and receiving therefrom the products of combustion, and having a chamber which receives from the fan the air to be heated; and means is provided for regulating the freedom of the heated air to flow from the heat-exchanger to the space to be heated. With such an arangement, throttling of the heated air, in its passage from the heat-exchanger to the space to be heated, causes an appreciable increase in the pressure of the air supplied to the mixing tube and combustion-chamber by the fan, with the result that there is an increase of the pressure in the mixing tube and in the combustion-chamber, and a resulting decrease in the flow of combustible gas. Thus when a less quantity of heated air is required by the space to be heated, a reduction in the quantity of gas which is consumed in the combustion-chamber automatically takes place, and, as a result, the heated air remains at approximately the same temperature. The throttling of the heated air can be done either manually or automatically by means of an adjustable thermostat designed to hold constant the temperature of the space to be heated.

The invention will be understood from the following description taken in connection with the accompanying drawing in which a warm-air heating system embodying the invention is diagrammatically represented.

In the drawing, the various parts of the heater are represented as arranged within a casing 2. Mounted within the casing 2 is a combustion-chamber 3 enclosed by an inner perforated casing 4 partially surrounded by an outer casing 5 which is spaced from the inner casing 4 and thus provides between them a space through which flows the secondary air which enters the inner casing 4 through the openings therein and thereby substantially supports combustion of the gas fuel which is supplied to the combustion-chamber 3 through the gas nozzle 7 and burner ports 8. An adjustable air port 9 is provided in the tube 10 to allow primary combustion air to enter said tube and mix with fuel gas entering the tube 10 from the gas nozzle 7, with the result that the air and gas are mixed thoroughly in the mixing tube 10 before passing into the combustion-chamber 3 through the burner ports 8. A spark plug 11 mounted in the casings 4 and 5 and extending into the combustion-chamber 3 serves to ignite the gas. A pressure regulator 12 is shown located in the gas supply pipe 14 through which the combustible gas is supplied to the nozzle 7. The pressure regulator 12 may be of any suitable and preferably adjustable type which maintains at a normal and substantially constant pressure the combustible gas which is supplied through the pipe 14 to the nozzle 7. An electrically operated valve is represented at 16 for controlling the flow of gas through the supply pipe 14 to the pressure regulator 12; but this electrically operated valve 16 forms no part of my invention. The combustion-chamber 3 is connected to a heat-exchanger, diagrammatically represented at the right end of the casing 2, so that the products of combustion pass into the chamber 20 and through it by a devious path (as shown by the arrows) and escape through an exhaust pipe 22 which may be connected to a chimney (not shown) or may merely extend out from the building in which the heater is located. The heat-exchanger is provided with another chamber 24 which is in heat-exchanging relationship to the chamber 20.

Mounted within the casing 2 and arranged to draw air (as indicated by the arrows) through the opening 26 into the space 27 within the left end of the casing 2, is a fan 28, preferably of the centrifugal type, which is driven by the electric motor 30 mounted within the casing 2. The fan 28 delivers air (as indicated by the arrows) to the space 27 at pressures which are always lower than the pressure at which the combustible gas is supplied to the nozzle 7. The compressed air thus supplied by the fan 28 flows from the space 27 into the combustion-chamber 3 through the openings in the shell 4 thereof; and said compressed air also flows into the chamber 24 of the heat-exchanger. The air thus supplied to the chamber 24 flows in a devious path (as shown by the arrows) through that chamber and is heated, with the result that hot air flows (as indicated by the arrows) into the chamber 32 at the right end of the casing 2 and thence through the distributing pipes 34, 36 and 38 to the rooms or other places in which a supply of warm air is desired.

As shown in the drawing, the distributing conduits 34, 36 and 38 are provided with means in the form of dampers 40, 41 and 42 which may be adjusted, either manually, as shown by knobs 43 and 44, or automatically, as shown by spiral thermostat 45, actuated by the temperature of the space to be heated, so as to regulate the freedom of the heated air to flow through said conduits. In the drawing, the ends of the conduits 34, 36 and 38 are shown as provided with diffusers having nozzles 46, 48 and 50 located within casings 52, 54 and 56 provided in their lower portions with openings 58, 60 and 62 through which air enters, and in their upper portions with openings 64, 66 and 68 through which the mixture of hot and cooler air passes into the space to be heated. However, it will be understood that my invention does not involve the use of diffusers or any particular attachments at the ends of the conduits 34, 36 and 38 beyond the dampers 40, 41 and 42 (or equivalent devices) which regulate the freedom of the heated air to flow from said conduits.

The manner in which my warm-air heating system operates will now be described. As has been explained, the motor driven fan 28 supplies compressed air to the space 27 from which it flows both to the combustion-chamber 3 and to the chamber 24 of the heat-exchanger. When all of the dampers 40, 41 and 42 are wide open, the air passing through the chamber 24 and the conduits 34, 36 and 38 flows with the minimum of impedance. When one or more of the dampers 40, 41 and 42 are partially or wholly moved to their closing positions, the flow of the heated air through the chamber 24 of the heat-exchanger is impeded, with the result that the air pressure created by the fan within the space 27 in the casing 2 increases. This increase of pressure around the primary air port 9 and around the inner and outer casings 4 and 5 of the combustion-chamber 3 increases the pressure within the mixing tube 10 and within the combustion-chamber 3, with the result that there is an increased opposition to the flow of gas from the nozzle 7 into the mixing tube 10 and into the combustion-chamber 3. Of course, the pressure within the space 27, within the mixing tube 10 and within the combustion-chamber 3 is at its maximum when all of the dampers 40, 41 and 42 are in their completely closed positions; and the pressure within the mixing tube 10 and the combustion-chamber 3 is at its minimum when those dampers are in their completely open positions. In practice, the gas pressure-regulator 12 is set so as to maintain the gas supplied to the nozzle 7 at a substantially constant and normal pressure, say that required to support 2½ inches of water; and the varying pressures of the air supplied by the fan to the space 27, to the mixing tube 10 and to the combustion-chamber 3 never exceed that required to support 2 inches of water, even when all of the dampers 40, 41 and 42 are set so that they shut off substantially all flow of warm air through the chamber 24 of the heat-exchanger and through the conduits 34, 36 and 38.

Thus it will be apparent that the rate of flow of the combustible gas from the nozzle 7 is automatically regulated by the variations in the pressure of the air supplied by the fan 28 to the mixing tube 10 and the combustion-chamber 3, resulting from the regulation by means of the dampers 40, 41 and 42 of flow of the heated air through the chamber 24 of the heat-exchanger and through the conduits 34, 36 and 38 to the spaces to be heated.

The primary air for combustion which enters the mixing tube 10 through the adjustable air port 9 may be varied in amount in any desired degree in order to promote the best combustion. The air port 9 may even be closed altogether, in which case the secondary air which enters the combustion-chamber 3 through the perforations in the inner casing 4 will supply all of the oxygen needed for combustion. Whether or not primary air is used for combustion forms no part of my invention since the heater disclosed herein will perform in the same manner regardless of the amount of opening of the adjustable air port 9.

What is claimed is:

1. A warm air heating system comprising a heat-exchanger, an enclosed combustion-chamber in communication therewith for supplying hot combustion products thereto, a constant speed fan for supplying air to both said chamber and said heat-exchanger, conduit means receiving the heated air from the heat-exchanger for delivery to the point of utilization, means for varying the impedance to the flow of air through said conduit means whereby the pressure in the heat-exchanger and combustion chamber is varied, means for supplying gaseous fuel to the combustion-chamber at a substantially constant pressure of a value only slightly in excess of the maximum pressure attainable in the combustion chamber, whereby the flow of gaseous fuel is automatically varied solely by reason of variations of pressure within the combustion-chamber acting in opposition to the constant pressure of the gas supplied thereto.

2. A warm air heating system comprising a heat-exchanger, an enclosed combustion-chamber in communication therewith for supplying hot combustion products thereto, a constant speed fan for supplying air to both said chamber and said heat-exchanger, conduit means receiving the heated air from the heat-exchanger for delivery to the point of utilization, means for varying the impedance to the flow of air through said conduit means whereby the pressure in the heat-exchanger and combustion-chamber is varied, means for supplying gaseous fuel to the combustion-chamber at a substantially constant pressure of the order required to support 2½ inches of water, the maximum air pressure attainable in the combustion chamber by varying the impedance to the flow in the conduits being about 80% of the pressure of the gaseous fuel, whereby the flow of gaseous fuel is automatically varied solely by reason of variations of pressure within the combustion-chamber acting in opposition to the constant pressure of the gas supplied thereto.

3. A warm air heating system comprising a single pressure chamber for heating and combustion air, a constant speed fan for supplying air thereto, a heat-exchanger adapted to receive air from said chamber, conduit means receiving the heated air from the heat-exchanger for delivery to the point of utilization, means for varying the impedance to the flow of air through said conduit means whereby the pressure in said chamber may be varied, a gaseous fuel burner located in said chamber and subject to the pressure therein, and means for supplying gas to said burner under a substantially constant pressure having a value only slightly in excess of the maximum pressure attainable in said chamber by varying the impedance to the flow in the conduits, whereby the flow of gas to the burner is automatically varied solely by reason of the variations in the pressure within said chamber acting in opposition to the substantially constant gas pressure.

CALVIN D. MacCRACKEN.

REFERENCES CITED

The following references are of record in the file of this patent:

UNITED STATES PATENTS

| Number | Name | Date |
| --- | --- | --- |
| 2,385,096 | McCollum | Sept. 18, 1945 |
| 2,440,052 | Lingen et al. | Apr. 20, 1948 |
| 2,454,511 | Heymann et al. | Nov. 23, 1948 |
| 2,460,207 | Wirth et al. | Jan. 25, 1949 |
| 2,488,548 | MacCracken | Nov. 22, 1949 |